(12) United States Patent
Klopfenstein et al.

(10) Patent No.: US 10,141,873 B2
(45) Date of Patent: Nov. 27, 2018

(54) SHOCK DETECTOR CIRCUIT AND METHOD FOR OPERATION THEREOF

(71) Applicant: ETA SA Manufacture Horlogere Suisse, Grenchen (CH)

(72) Inventors: Francois Klopfenstein, Delemont (CH); Joerg Berthoud, Villeret (CH); Nicolas Jeannet, Chambrelien (CH); Yves Godat, Cornaux (CH); Thierry Bonnet, Geneva (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 0 days.

(21) Appl. No.: 15/292,694

(22) Filed: Oct. 13, 2016

(65) Prior Publication Data

US 2017/0141710 A1    May 18, 2017

(30) Foreign Application Priority Data

Nov. 18, 2015  (EP) .................................... 15195209

(51) Int. Cl.
*H02P 8/02*    (2006.01)
*G01P 15/08*   (2006.01)
*G04C 3/14*    (2006.01)

(52) U.S. Cl.
CPC ............ *H02P 8/02* (2013.01); *G01P 15/0802* (2013.01); *G04C 3/143* (2013.01)

(58) Field of Classification Search
CPC ........ G01P 15/0802; G04C 3/143; H02P 8/02
See application file for complete search history.

(56) References Cited

U.S. PATENT DOCUMENTS 4,321,519 A    3/1982  Ueda et al.
4,404,510 A *  9/1983  Nakajima ............... G04C 3/143
                                                    318/685

(Continued)

FOREIGN PATENT DOCUMENTS

EP    1 117 016 A1    7/2001
EP    1 693 720 A1    8/2006

(Continued)

OTHER PUBLICATIONS

European Search Report dated Jun. 16, 2016 in European Application 15195209.0 filed Nov. 18, 2015 (with English Translation of Categories of cited documents & Written Opinon).

*Primary Examiner* — Muhammad S Islam
(74) *Attorney, Agent, or Firm* — Oblon, McClelland, Maier & Neustadt, L.L.P.

(57) ABSTRACT

The present invention concerns an electronic device comprising a calculation unit capable of generating a signal representative of a physical magnitude, for a motor driving a display device, said motor comprising a rotor in a magnetic circuit, two terminals, one positive and one negative, via which the calculation unit controls the motor, the electronic device further comprising at least one shock detector circuit connected between the calculation unit and a motor terminal for the detection of an external shock applied to the motor, said motor having a first position of stable equilibrium placed at a reference angular position and a second position of stable equilibrium placed at 180° from the first stable angular position, for each direction of rotation, a maximum angular position from which it is no longer possible to return the motor rotor into a prior angular position,
the calculation unit using an algorithm which, following a shock, can detect the direction of rotation of the rotor by analyzing an induced voltage detected by said detector (Continued)

circuit and cause to be sent a blocking pulse of reverse polarity to that of the induced voltage.

10 Claims, 4 Drawing Sheets

(56) References Cited

U.S. PATENT DOCUMENTS

| | | |
|---|---|---|
| 6,452,358 B1 | 9/2002 | Iijima et al. |
| 2007/0115760 A1 | 5/2007 | Kitazawa et al. |
| 2011/0013494 A1 | 1/2011 | Sato et al. |
| 2014/0084832 A1* | 3/2014 | Sato ........................ H02P 27/08 |
| | | 318/452 |
| 2017/0285577 A1* | 10/2017 | Godat .................... G04C 3/143 |

FOREIGN PATENT DOCUMENTS

| | | |
|---|---|---|
| EP | 2 249 214 A1 | 11/2010 |
| FR | 2 426 999 | 12/1979 |
| JP | 58-66887 | 4/1983 |

* cited by examiner

SHOCK DETECTOR CIRCUIT AND METHOD FOR OPERATION THEREOF

This application claims priority from European Patent Application No 15195209.0 of Nov. 18, 2015, the entire disclosure of which is hereby incorporated herein by reference.

The present invention concerns an electronic device comprising a calculation unit capable of generating a signal representative of a physical magnitude, for a motor driving a display device, said motor comprising two terminals, one positive and one negative, via which the calculation unit controls the motor, the electronic device further comprising at least one shock detector circuit connected between the calculation unit and the motor terminals for the detection of an external shock applied to the motor.

BACKGROUND OF THE INVENTION

There are known timepieces comprising a case inside which an electromechanical timepiece movement is arranged. Such a movement is clocked by a quartz oscillator system. For the display of time indications, such as the hour and second, hands are mounted on motors to be driven in rotation. The motors used are Lavet type motors, also called stepping motors. In these motors, a magnetically charged rotor of cylindrical shape creates a radial magnetic field in the air gap of a magnetic circuit, on which is wound a coil whose terminals are connected to a control circuit, generally an integrated circuit, supplying current pulses, each pulse causing the rotor to advance one step. The coil is formed by a very fine wire, wound on a hollow, insulating tube containing therein one part of the magnetic circuit.

These motors, located inside the watch, are subjected to shocks which may be caused by the watch being dropped or by a violent movement of the user. These shocks are then likely to disrupt the operation of the motors. These disruptions consist of an uncontrolled movement of the rotor or rotors whereby their inertia causes the skipping of at least one step.

Consequently, the time indications provided by the hands are likely to no longer be accurate.

To overcome this, there exist shock detector systems. To achieve this, an electronic device is responsible for measuring the tension induced by the motor during a shock. Indeed, under the effect of the displacement (rotation) of the rotor, an induced voltage is generated. This induced voltage is detected by a detector circuit which compares the induced voltage to a predetermined threshold. If the voltage is higher than said threshold, the detector circuit deduces that a shock has occurred and transmits the information to a control unit.

In response to the shock, the control unit sends to the motor a blocking pulse used to block any rotation of the rotor caused by the shock.

The blocking pulse must allow the rotor to be blocked in a well-defined position so that no error occurs in the position of the hand.

SUMMARY OF THE INVENTION

It is an object of the invention to overcome the drawbacks of the prior art by proposing to provide a shock detector device for a motor allowing the detection of a shock in a faster and more accurate manner.

To this end, the present invention concerns an electronic device comprising a calculation unit capable of generating a signal representative of a physical magnitude, for a motor driving a display device, said motor comprising a rotor in a magnetic circuit, two terminals, one positive and one negative, via which the calculation unit controls the motor, the electronic device further comprising two shock detector circuits, each detector circuit being connected between the calculation unit and a motor terminal for the detection of an external shock applied to the motor, said motor having a first position of stable equilibrium placed at a reference angular position and a second position of stable equilibrium placed at 180° from the first stable angular position, for each direction of rotation, a maximum angular position from which it is no longer possible to return the motor rotor into a prior angular position, the calculation unit using an algorithm which, following a shock, can detect the direction of rotation of the rotor by analysing an induced voltage detected by said detector circuit and cause to be sent a blocking pulse of reverse polarity to that of the induced voltage, characterized in that the blocking pulse has a maximum duration of 58.5 ms allowing the shock-induced rotation of the rotor to be stopped and returned to a predetermined angular position before the maximum angular position is reached.

In a first advantageous embodiment, the blocking pulse has a chopping rate or level that varies from 25% to 100%.

In a second advantageous embodiment, the blocking pulse comprises at least a first and a second distinct temporal or time phase, each phase being capable of presenting a distinct chopping rate.

In a third advantageous embodiment, the second phase has a longer duration than the first phase.

In a fourth advantageous embodiment, the second phase has a duration two times longer than the first phase.

In a fifth advantageous embodiment, the shock detector circuit comprises a selection part adapted to allow adjustment of detection sensitivity.

In another advantageous embodiment, the selection part allows for a range of sensitivity from 50 to 600 millivolts.

In another advantageous embodiment, the motor is arranged so that the position of stable equilibrium of the rotor is positioned at an angle of 90° with respect to the main axis of the coil generated magnetic flux, the maximum angular position being, for each direction of rotation, 270° with respect to the reference position.

In another advantageous embodiment, the motor is arranged so that the position of stable equilibrium of the rotor is positioned at an angle of at least 30° with respect to the main axis of the stable coil generated magnetic flux, the maximum angular position being, for each direction of rotation, at least 120° with respect to the reference position.

In another advantageous embodiment, the blocking pulse is sent to the motor via one or other of its connection terminals.

BRIEF DESCRIPTION OF THE DRAWINGS

The objects, advantages and features of the invention will appear more clearly in the following detailed description of at least one embodiment of the invention, given solely by way of non-limiting example and illustrated by the annexed drawings, in which.

DETAILED DESCRIPTION

The present invention proceeds from the general idea of providing a shock detector device for a motor allowing the detection of a shock in a faster and more accurate manner.

Figure 1:
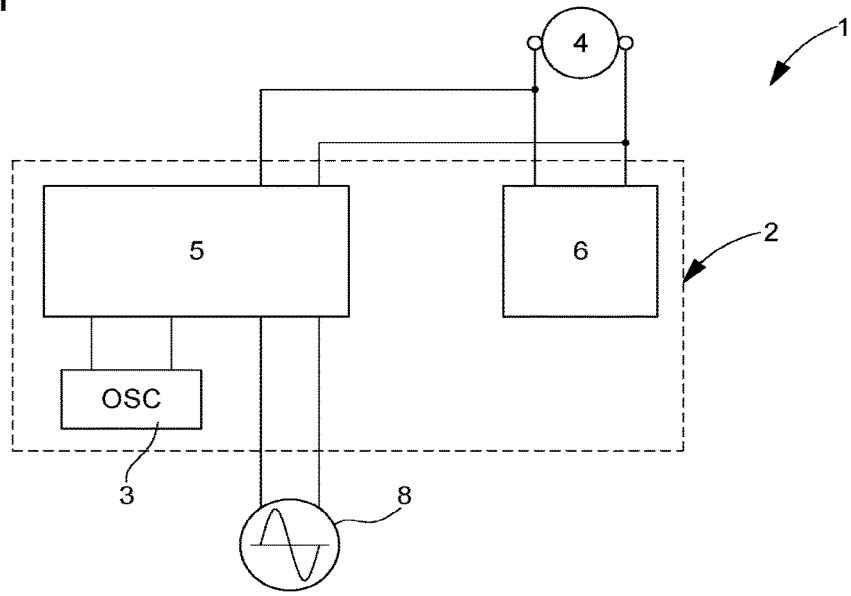
FIG. 1 shows a general diagram of the electronic device according to the invention.
Figure 4:
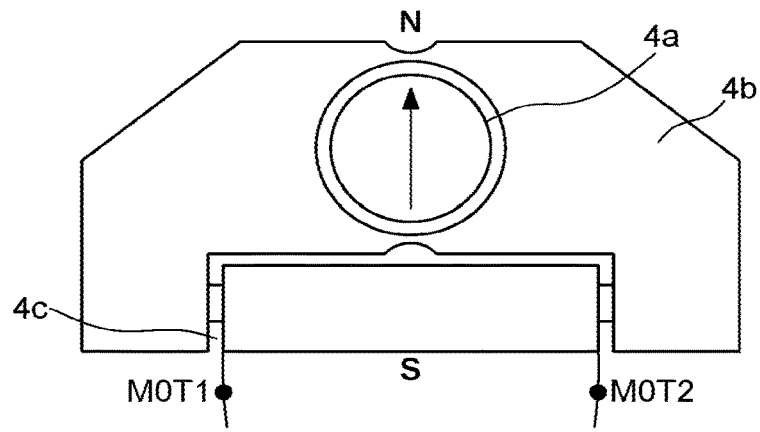
FIGS. 4 to 6 schematically represent a motor according to the invention.

FIG. 1 represents a schematic view of an electronic movement. This movement or electronic device 1 comprises a control module 2 clocked by a quartz oscillator system 3. For the display of time indications, such as the hour and second, hands are mounted on motors 4 to be driven in rotation. The motors used are Lavet motors, also called stepping motors, and comprise two connection terminals Mot1 and Mot2. In these motors, a magnetically charged rotor 4a of cylindrical shape creates a radial magnetic field in the air gap of a magnetic circuit 4b, on which is wound a coil whose terminals are connected to the control module, generally an integrated circuit, supplying current pulses in order to the terminals, each pulse causing the rotor to advance one step. The coil is formed by a very fine wire, wound on a hollow, insulating tube containing therein one part of the magnetic circuit. This motor also has two positions of stable equilibrium 4c, as seen in FIG. 4. Control module 2 generally comprises a calculation unit 5. The assembly is powered by a power unit 8, such as a cell or battery. The power unit supplies a supply voltage Vdd. There is also an earth terminal Vss.

Such a motor has two positions of stable equilibrium, i.e. two positions into which the rotor naturally moves if the electrical power supply fails.

Figure 3:
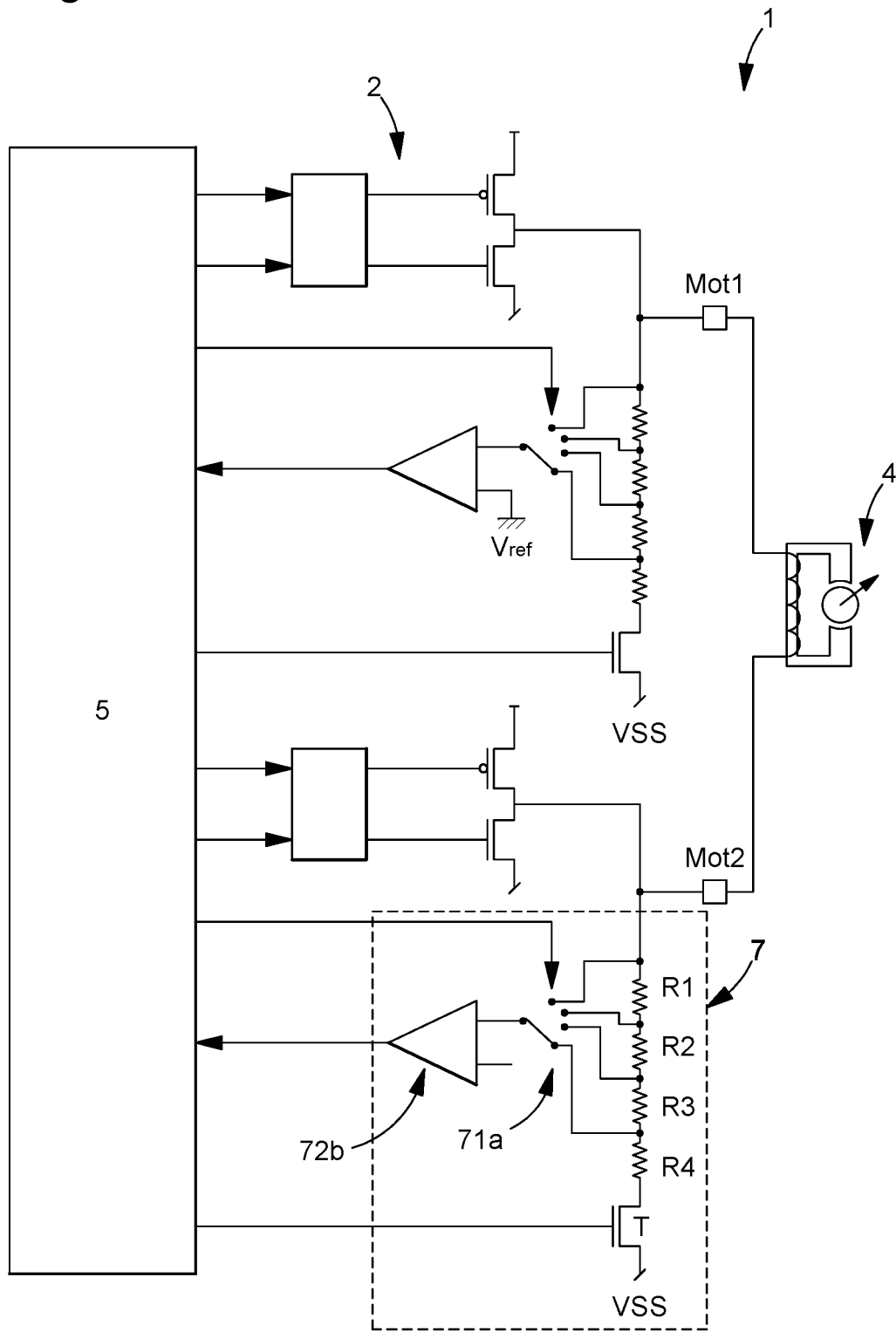

Control module 2, seen in FIG. 3, further comprises a detection unit 6 comprising at least one shock detector circuit 7. Shock detector circuit 7 is used to determine whether a shock has occurred. Thus, if a shock is detected, control module 2 can act accordingly and send a blocking pulse to prevent the rotor from starting to rotate. The shock detector circuit is placed at the output of at least one of the motor terminals. The following description will take the example of a shock detector circuit 7 connected to the negative terminal Mot2 of the motor. At each motor terminal Mot1, Mot2, a voltage Vmot is measured. At each terminal Mot1, Mot2, a motor buffer is arranged, these motor buffers comprise a flip-flop B1, B2 and two different types of transistors connected in series, the gates of the transistors being connected to the flip-flop as seen in FIG. 3. The buffers are used to pass either a positive or a negative current through the motor coil in order to make it rotate.

Figure 2:
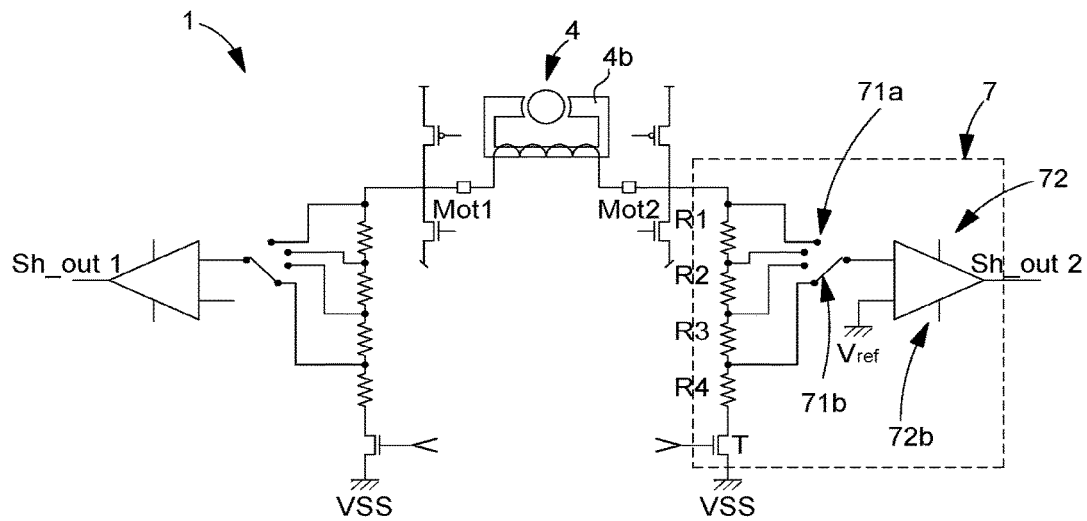
FIGS. 2 and 3 show detailed views of a shock detector circuit according to the invention.

In FIG. 2, it is noted that shock detector circuit 7 may comprise a selection part 71 directly connected to terminal Mot2 of motor 4. This selection part 71 has an output connected to a comparison part 72. Comparison part 72 is connected to calculation unit 5 so as to provide the signal indicating whether or not a shock is detected.

The selection part comprises a series of series-connected resistors Ri associated with a selector 71a in the form of a multi-position switch. Selector 71a comprises an output and a plurality of selection points pi, each associated with a resistor Ri. Selector 71a further comprises a flip-flop 71b for connecting the output of her selector to one of selection points pi. Flip-flop 71b thus allows the sensitivity of the shock detector to be modified so as to detect higher or lower induced voltages and thus stronger or weaker shocks. According to the invention, resistor series Ri is calculated to have a sensitivity ranging from 50 to 600 millivolts. The output of selector 71a is voltage V1 which is connected to comparison part 72. Comparison part 72 comprises a comparator 72b whose positive input is connected to the output of selector 71a and whose negative input is at a reference voltage Vref of 50 mV (not represented). Comparator 72b provides an output Sh_out2. Resistor chain Ri is controlled by transistor T which can activate the shock detector. Advantageously according to the invention, each terminal Mot1, Mot2 of the Lavet motor is provided with a shock detector circuit 7 in order to be associated with a control algorithm which, in the event of a shock, controls rotor 4a as seen in FIG. 3.

In a first step, control module 2 is programmed to detect the direction of rotation of the shock. To achieve this, both shock detection circuits 7 are used. Each shock detector circuit 7 is connected to a motor terminal so that, in the event of a shock, the rotor turns causing an induced voltage in shock detector circuits 7. These shock detector circuits 7 send an item of information to control module 2 indicating that a shock has occurred. Depending on the order in which the information arrives, it is easy to detect the rotation of the rotor. As only positive induced voltages are detected by one detector or the other, the direction of rotation of the rotor can be deduced.

Indeed, control module 2 is provided with a programme allowing it to interpret the information sent by shock detector circuits 7. To achieve this, the programme defines the direction of rotation of the shock according to the activation of shock detector circuits 7.

During a shock, rotor 4a rotates, an induced voltage appears, so that if the induced voltage is positive, then rotor 4a is rotating clockwise, whereas if the induced voltage is negative, then rotor 4a is rotating anticlockwise. Of course, shock detection occurs when the rotor is initially in one of its positions of stable equilibrium 4c, as seen in FIG. 4.

Following detection of the direction of rotation of the shock, it is then possible to apply a shock compensation protocol in order to cancel the effects of said shock. Indeed, the present invention advantageously proposes a compensation protocol to cancel or limit as far as possible the effects of the shock.

This compensation protocol consists in applying a blocking signal to the motor, by means of control unit 2. This blocking signal is a signal that counteracts the rotation of rotor 4a in the event of a shock.

The blocking signal is a pulse sent to at least one of the connection terminals of motor 4 in order to act on the rotor. This pulse is defined as allowing a reverse action to that of the shock on rotor 4a. Thus, if the rotor is subjected to a shock causing it to rotate clockwise, then the blocking signal is a pulse whose signal is adapted to drive the rotor anticlockwise and vice versa.

Advantageously according to the invention, the blocking signal, i.e. the blocking pulse is configured to move the rotor into a desired position. Indeed, if rotor 4a is driven by the shock, this means that the equipment connected to said motor is driven; this equipment consists of gear trains driving the hands. Consequently, a change appears in the position of the hands and thus an error appears in the time information display.

Consequently, the blocking pulse is configured, not only to block the rotation of the rotor following the shock, but also to ensure that the rotor returns to its initial stable position when the shock ends and the blocking pulse stops.

This objective of returning rotor 4a to a desired position at the moment of the shock entails the achievement of a secondary objective. Indeed, in this type of motor, there is a known angular position of rotor 4a, called the point of no-return and defined as being the angular position beyond which the rotor can no longer be returned to its initial position.

Figure 5:
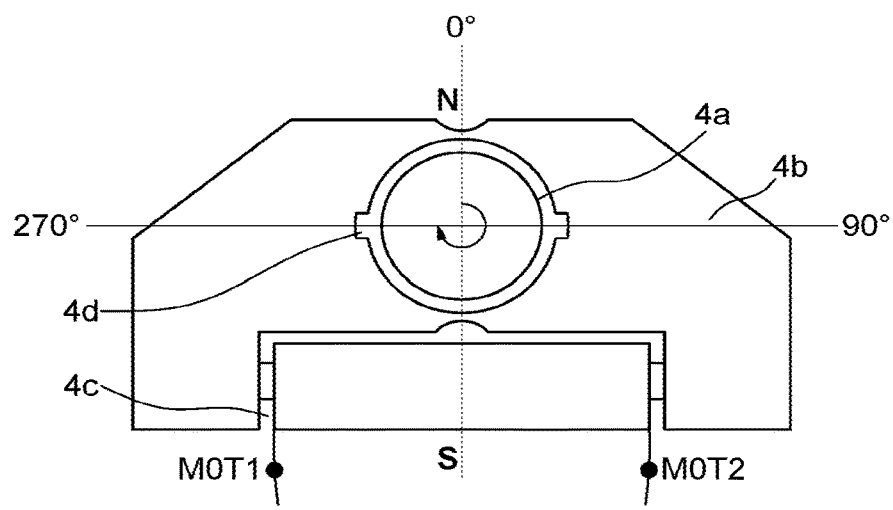
Figure 6:
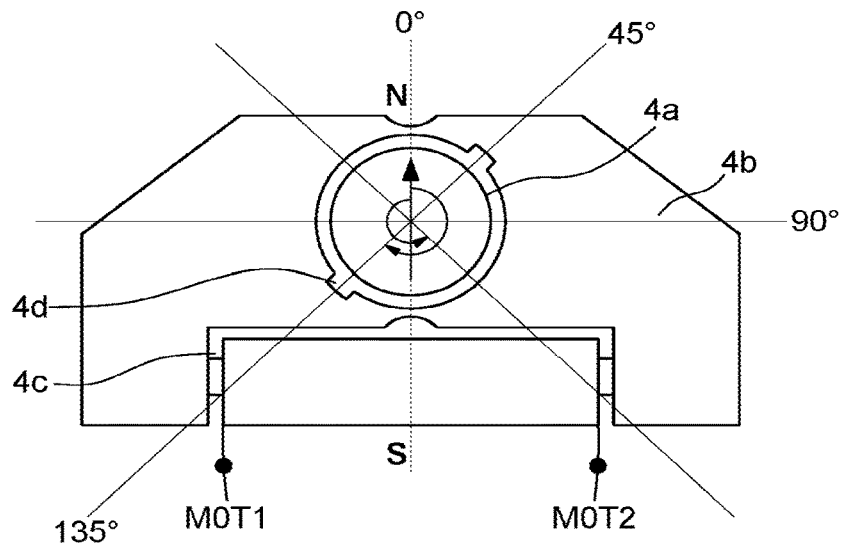

Indeed, as the rotor rotates, the latter picks up speed and consequently a moment of inertia. Therefore, if it reaches a certain angular position, it becomes physically impossible to return rotor 4a to the desired position. This maximum angular position depends on the arrangement of the motor. In fact, each motor comprises at least two guide-slots 4d or positioning notches. These guide-slots 4d are arranged in an angular position and define the stable equilibrium positions of the rotor. The maximum angular position depends on the position of these guide-slots 4d with respect to the direction of the main magnetic flux generated by the coil. Thus, in the case where the two guide-slots are arranged at 90 degrees, as seen in FIG. 5, the maximum angular position is 270 degrees, i.e. the angular position of one of the guide-slots. In the case where the guide-slots are arranged at 45 degrees, as seen in FIG. 6, the maximum angular position is 135 degrees.

According to the invention, in the event of shocks, the blocking pulse is arranged to allow the rotor to return to a desired position without passing a maximum angular position. In this regard, the blocking pulse is a pulse provided with a plurality of phases. This plurality of phases provides the possibility of modifying the characteristics of the blocking pulse.

In the present case, the blocking pulse comprises two phases, a first phase Ph1 may be an intense phase, i.e. during which the intensity of the retaining torque is maximum, and a second phase Ph2, in which the retaining torque is less intense.

In order to vary the intensity of the retaining torque created by the pulse, the chopping rate is arranged to be varied, i.e. the pulse duty cycle. Depending on the chopping rate, the pulse is more or less intense to have a more or less important effect on the rotor. According to the invention, the chopping rate is arranged to vary from 25% to 100%. Consequently, it may be advantageous to have a first blocking pulse phase with a high chopping rate and a second phase with a lower chopping rate.

Further, phases of different durations could be provided. For example, first phase Ph1 will be short but with a high chopping rate, whereas second phase Ph2 will have a longer duration but a lower chopping rate.

Figure 7:
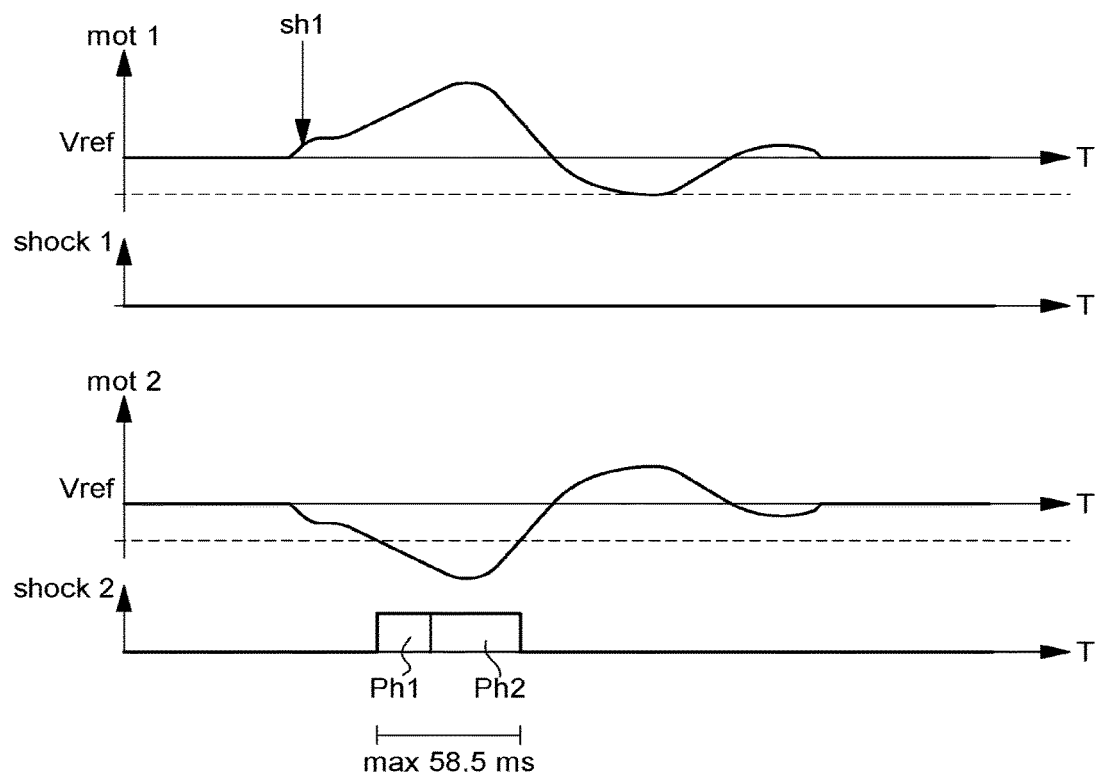
FIG. 7 represents flow diagrams for the electronic device according to the invention.

In a preferred example, the second phase will have a duration equal to two times the duration of the first phase. The first phase will have here a maximum duration of 19.5 milliseconds. In that case, the total duration of the blocking pulse will be a maximum of 58.5 milliseconds, as seen in FIG. 7.

Thus, sending the blocking pulse, whose polarity is the reverse of that of the rotation of rotor 4a, makes it possible to stop the rotation of the rotor and return it to the desired position.

Once in this desired position, the rotor naturally moves towards its initial position of stable equilibrium when the pulse has stopped.

However, there is advantageously provided a variant wherein this movement towards a position of stable equilibrium is detected. To achieve this, the shock detector circuits are adjusted to have maximum sensitivity. To achieve this, flip-flop 71b is switched to act on resistor series Ri and to select the lowest sensitivity, which is 50 mV here.

This low sensitivity makes it possible to measure the induced voltage following the very small movement of the rotor when the latter moves to a position of stable equilibrium. Depending on the positive or negative sign of the induced voltage, it then becomes possible to tell which of the positions of stable equilibrium the rotor has moved to. Consequently, calculation unit 5 can take this information into account for the time information.

It will be clear that various modifications and/or improvements evident to those skilled in the art may be made to the various embodiments of the invention described in this description without departing from the scope of the invention.

What is claimed is:

1. An electronic device comprising:
   calculation circuitry configured to generate a signal representative of a physical magnitude, for a motor driving a display device, said motor comprising a rotor in a magnetic circuit, two terminals, one positive and one negative, via which the calculation circuitry controls the motor,
   two shock detector circuits, each shock detector circuit being connected between the calculation circuitry and one of the two terminals for the detection of an external shock applied to the motor,
   said motor having a first position of stable equilibrium placed at a reference angular position and a second position of stable equilibrium placed at 180° from the first stable angular position, for each direction of rotation, a maximum angular position from which the rotor is unable to return to a prior angular position, and
   the calculation circuitry using an algorithm which, following a shock, detects the direction of rotation of the rotor by analysing an induced voltage detected by said shock detector circuit and sends a blocking pulse of reverse polarity to that of the induced voltage to stop and return the rotation,
   wherein the blocking pulse has a maximum duration of 58.5 ms to stop and return the rotor to a predetermined angular position before the rotor reaches the maximum angular position.

2. The electronic device according to claim 1, wherein the blocking pulse has a chopping rate that varies from 25% to 100% of a duty cycle of the blocking pulse.

3. The electronic device according to claim 1, wherein the shock detector circuit comprises a sensitivity selector adjusting a detection sensitivity of the shock detector circuit.

4. The electronic device according to claim 1, wherein the motor is arranged such that the positions of stable equilibrium of the rotor when there is no current flowing through a coil placed at an angle of 30 to 90 degrees with respect to the axis of the main flux generated by the coil in the magnetic circuit when a current passes therethrough.

5. The electronic device according to claim 1, wherein the blocking pulse is sent to the motor via one or other of the two terminals thereof.

6. The electronic device according to claim 2, wherein the blocking pulse comprises at least a first phase and a second phase distinct from each other, each phase including a distinct chopping rate.

7. The electronic device according to claim 3, wherein the sensitivity selector allows for a range of the detection sensitivity from 50 millivolts to 600 millivolts.

8. The electronic device according to claim 6, wherein the second phase has a longer duration than the first phase.

9. The electronic device according to claim 8, wherein the second phase has a duration two times longer than the first phase.

10. An electronic device comprising:

calculation circuitry configured to generate a signal representative of a physical magnitude, for a motor driving a display device, said motor comprising a rotor in a magnetic circuit, two terminals, one positive and one negative, via which the calculation circuitry controls the motor, two shock detector circuits, each shock detector circuit being connected between the calculation circuitry and one of the two terminals for the detection of an external shock applied to the motor, said motor having a first position of stable equilibrium placed at a reference angular position and a second position of stable equilibrium placed at 180° from the first stable angular position, for each direction of rotation, a maximum angular position from which the rotor is unable to return to a prior angular position, and the calculation circuitry using an algorithm which, following a shock, detects the direction of rotation of the rotor by analysing an induced voltage detected by said shock detector circuit and sends a blocking pulse of reverse polarity to that of the induced voltage to stop and return the rotation, wherein the blocking pulse has a maximum duration of 58.5 ms to stop and return the rotor to a predetermined angular position before the rotor reaches the maximum angular position, and wherein the blocking pulse comprises at least a first phase and a second phase distinct from each other, each phase including a distinct chopping rate, the first phase has a larger chopping rate than the second phase, and the second phase occurs after the first phase.

* * * * *